(12) United States Patent
Chuc et al.

(10) Patent No.: US 8,985,953 B2
(45) Date of Patent: Mar. 24, 2015

(54) ROTOR PROVIDED WITH A DEVICE FOR PROTECTING IT AGAINST LIGHTNING, AND AN AIRCRAFT PROVIDED WITH SUCH A ROTOR

(75) Inventors: Charles Chuc, Marseilles (FR); Nicolas Imbert, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 980 days.

(21) Appl. No.: 13/110,247

(22) Filed: May 18, 2011

(65) Prior Publication Data

US 2011/0284688 A1 Nov. 24, 2011

(30) Foreign Application Priority Data

May 24, 2010 (FR) .................................. 10 02168

(51) Int. Cl.
*B64D 45/02* (2006.01)
*B64C 27/32* (2006.01)

(52) U.S. Cl.
CPC ................ *B64C 27/32* (2013.01); *B64D 45/02* (2013.01)
USPC ..................... 416/146 R; 244/1 A; 244/17.25; 416/244 R

(58) Field of Classification Search
CPC ................................ B64D 45/02; B64C 27/32
USPC ........... 416/146 R, 224–226, 229, 230, 244 R
See application file for complete search history.

(56) References Cited

U.S. PATENT DOCUMENTS 3,945,256 A * 3/1976 Wilson et al. .................. 73/455
4,625,256 A 11/1986 Scuka et al.
5,863,181 A * 1/1999 Bost et al. ..................... 416/224
7,377,750 B1 * 5/2008 Costin et al. ............. 416/146 R
7,468,505 B2 * 12/2008 Kraemer ................... 250/227.11
2009/0038819 A1 2/2009 Molbech
2012/0282097 A1 * 11/2012 Lewke et al. ............. 416/146 R

FOREIGN PATENT DOCUMENTS

| EP | 0718495 A1 | 6/1996 |
| EP | 0754624 A1 | 1/1997 |
| EP | 1154537 A2 | 11/2001 |
| EP | 1930586 A1 | 11/2008 |

OTHER PUBLICATIONS

Search Report and Written Opinion; Application No. FR1002168; dated Dec. 2, 2010.

* cited by examiner

*Primary Examiner* — Nathaniel Wiehe
*Assistant Examiner* — Woody A Lee, Jr.
(74) *Attorney, Agent, or Firm* — Brooks Kushman P.C.

(57) ABSTRACT

A rotor (10) provided with a hub (11) and a plurality of blades (12), said rotor (10) including a mast (15) secured to said hub (11) and protection means (30) for providing protection against lightning. The protection means (30) comprise rotary electric current conduction means (32) constrained to rotate with said mast (15) and connected to each of the blades (12) via a respective first electrical connection member (31), said protection means (30) including non-rotary electric current conduction means (33) facing said rotary conduction means (32) while not being constrained to rotate with said mast (15), said protection means (30) including electrical connection trigger means (35), said non-rotary conduction means (33) being provided with a second electrical connection member (34) suitable for being electrically connected to a target member (38) external to said rotor (10).

20 Claims, 1 Drawing Sheet

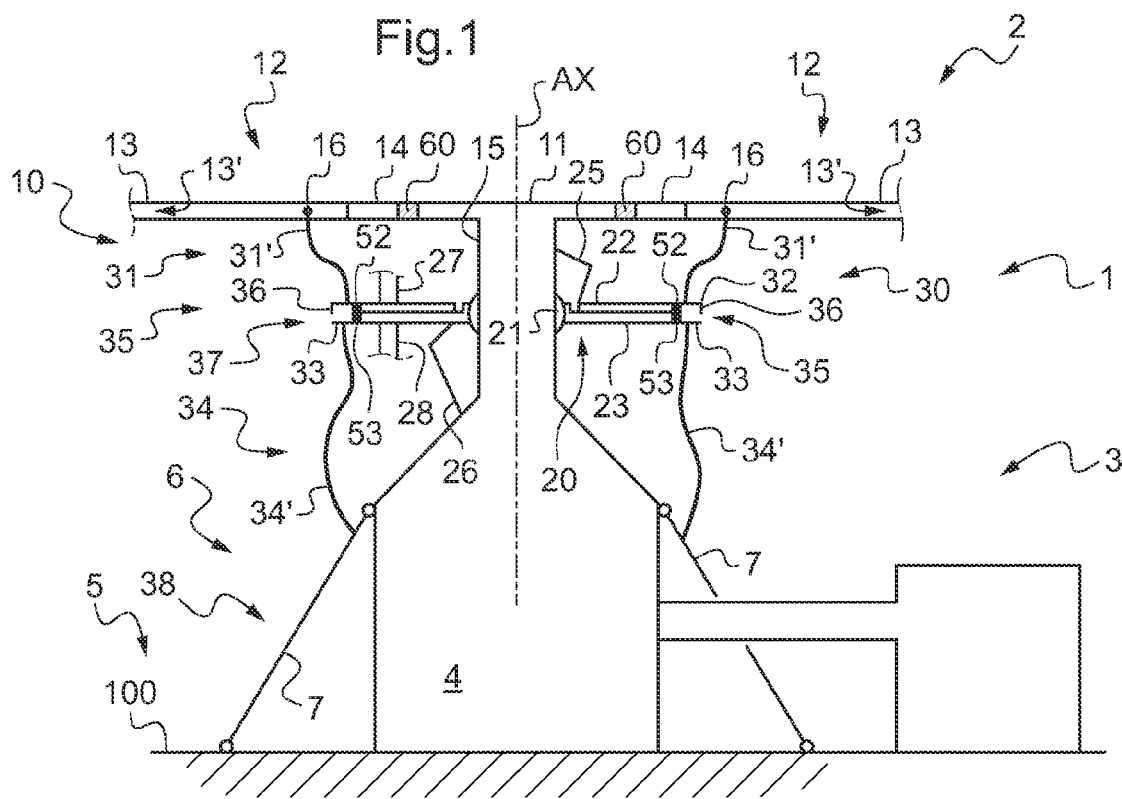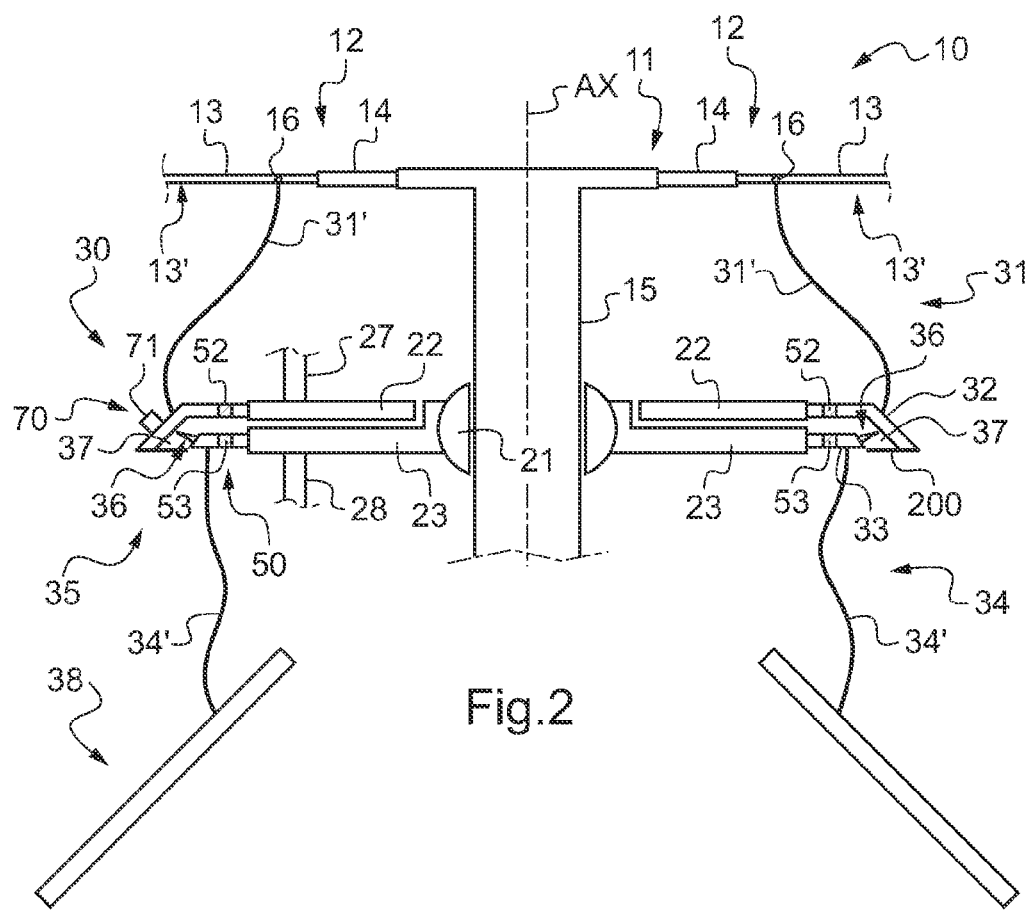

ROTOR PROVIDED WITH A DEVICE FOR PROTECTING IT AGAINST LIGHTNING, AND AN AIRCRAFT PROVIDED WITH SUCH A ROTOR

CROSS REFERENCE TO RELATED APPLICATIONS

This application claims the benefit of FR 10 02168 filed on May 24, 2010, the disclosure of which is incorporated in its entirety by reference herein.

BACKGROUND OF THE INVENTION (1) Field of the Invention

The present invention relates to a rotor provided with a device for protecting it against lightning, and to an aircraft provided with said rotor, such as a rotary-wing aircraft.

The invention thus lies in the technical field of means for providing protection against lightning, and more particularly means for providing rotary-wing aircraft with protection against lightning.

(2) Description of Related Art

Aircraft are likely to be struck by lightning while flying in difficult weather conditions. In the event of a lightning strike, it is appropriate to verify that the aircraft has not been damaged. Unfortunately, it is particularly difficult to detect the path followed by the lightning after such a strike, and consequently to detect which mechanical and electrical pieces of equipment have conveyed a potentially destructive electric current.

On a helicopter provided with a rotary wing having a main lift rotor driven by a power gearbox, lightning generally strikes the main rotor, and passes through the helicopter airframe, prior to escaping from the helicopter, e.g. via its tail. By way of example, there may be damage to the power gearbox, and in particular its epicyclic speed reduction stage, to the means fastening the gearbox to the airframe, or indeed to the electronic equipment through which the lightning has passed.

Nevertheless, since it is difficult to identify the path followed by the lightning, a lightning strike may lead to the helicopter being grounded for a long time while the manufacturer verifies proper operation of a large number of items of equipment. Under extreme circumstances, such a strike may lead to all of the equipment that might have been affected being replaced.

In particular, the teaching of the following documents is known: U.S. Pat. No. 7,377,750 B1; EP 1 154 537 A2; EP 1 930 586 A1; EP 0 718 495 A1; EP 0 754 624 A1; and U.S. Pat. No. 4,625,256 A.

Furthermore, document US 2009/038819 presents a wind turbine provided with a nacelle carried by a mast, the nacelle supporting a rotor that rotates about a horizontal axis of rotation.

The wind turbine is provided with rotary protection means and stationary protection means connected together by connection means provided with two contact means, those contact means being connected together by an electrical conductor that establishes a continuous connection.

Document U.S. Pat. No. 4,625,256 describes a wind turbine having a rotor fastened on a drive shaft that extends along a vertical axis of rotation.

Furthermore, the wind turbine possesses protection means for defining a privileged path to be followed by an electric current generated by a lightning strike. Those protection means comprise a rotary first ring of frustoconical shape fastened to the drive shaft and a non-rotary second ring also of frustoconical shape, the first and second rings being separated by an annular space.

SUMMARY OF THE INVENTION

An object of the present invention is to propose a rotor provided with optimized means for providing protection against lightning.

According to the invention, a rotor is provided with a hub and a plurality of blades supported by the hub, the rotor including a mast secured to the hub to drive the hub and the blades in rotation about an axis of rotation, the mast being suitable, for example, for being driven in rotation by a power gearbox fastened to an airframe of the aircraft by fastener means, the rotor having protection means for providing protection against lightning.

The rotor is remarkable in particular in that the protection means comprise rotary electric current conduction means constrained to rotate with the mast and connected to each blade via a first electrical connection member. In addition, the protection means comprise non-rotary electric current conduction means facing the rotary conduction means, the non-rotary conduction means not being constrained to rotate with the mast. The protection means then have electrical connection trigger means arranged on at least one of the conduction means in a space separating the non-rotary conduction means from the rotary conduction means, the non-rotary conduction means being provided with a second electrical connection member suitable for being electrically connected to a target member external to the rotor.

It should be observed that the term "rotary" is used to designate members that perform rotation about said axis of rotation, and the term "non-rotary" is used to designate members that do not perform such rotation. The hub, the blades, the rotor mast, and the elements of the first electrical connection member constitute in particular members that are rotary in the meaning of the above definition, whereas the elements of the second electrical connection member constitute in particular members that are non-rotary. The trigger means arranged on the rotary conduction means are rotary members, with trigger means arranged on the non-rotary conduction means being, on the contrary, non-rotary members.

Thus, when lightning strikes the rotor, the electric current generated by the lightning passes from the blade to the rotary conduction means, via the first electrical connection member, a cable made using an aluminum alloy. The electrical connection trigger means then facilitates creating an electric arc between the rotary conduction means and the non-rotary conduction means by locally concentrating electrons.

The electric current then passes through the non-rotary conduction means and is subsequently rapidly discharged to a target member by the second electrical connection member, a cable made using an aluminum alloy. The target member may be the airframe of the aircraft, or indeed fastener means for fastening a power gearbox, the fastener means possibly being electrically insulated from the power gearbox.

The flow of electric current is then guided by the protection means over a predetermined flow path so as to avoid the sensitive members of the rotor, with the electric current being directed along this path very quickly in order to limit potential damage.

The rotor may also include one or more of the following characteristics.

For example, the rotary conduction means and the non-rotary conduction means are carried by the mast, the rotor having electrical insulation between the rotary conduction means and the mast and also between the non-rotary conduction means and the mast.

Thus, even if the electric current that results from the lightning behaves erratically, it cannot pass from the conduction means to the mast, at least not in quantities that might damage members associated with the mask.

Furthermore, at least a first electrical connection member may be fastened firstly to a metal-plated point of the leading edge of a blade and secondly to the rotary conduction means. It is found that by fastening the first electrical connection member to the leading edge, the passage of lightning along the predefined path is encouraged, since lightning is initiated mainly along the leading edge of the blade.

Furthermore, the rotor optionally includes electrical insulation means located between the metal-plated point and the hub in order to guarantee that the major fraction of the electric current generated by the lightning passes via the first connection means.

Each blade has a lift surface and a portion for fastening it to the hub, and the electrical insulation means may be a member presenting high electrical resistance that is interposed between the metal-plated point and the hub in the fastener portion, e.g. a cuff made of plastics material.

Furthermore, the electrical connection trigger means comprise at least one pointed trigger pivot.

Each trigger pivot serves to concentrate electrons by the point effect, thereby encouraging the creation of an electric arc between the rotary electrical conduction means and the non-rotary electrical conduction means. Since an electric arc is created quickly, the probability of the electric current that is generated by the lightning following a path other than the predefined path is minimized.

It should be observed that the electrical connection trigger means preferably comprise at least one pointed trigger pivot arranged vertically in register with each blade.

This minimizes the path to be traveled by the electric current so as to encourage the electric current to pass along the predefined path. Trigger pivots may also be located outside zones that are vertically in register with the blades.

Furthermore, the rotor includes means for modifying the pitch of the blades, which means comprise an assembly of a non-rotary swashplate that is not constrained to rotate with the mast and a rotary swashplate that is constrained to rotate with the mast, the rotary swashplate being connected to each blade via a respective pitch rod, the rotary conduction means being fastened to the rotary swashplate and the non-rotary conduction means being fastened to the non-rotary swashplate.

For example, each swashplate has an inner periphery facing the mast and an outer periphery, and the non-rotary and rotary conduction means are arranged respectively at the outer peripheries of the non-rotary and rotary swashplates. The non-rotary and rotary conduction means may also be plates, optionally plates that are streamlined for aerodynamic reasons.

Preferably, the rotor may then be provided with a first electrically insulating spacer between the rotary conduction means and the rotary swashplate, and with a second electrically insulating spacer between the non-rotary conduction means and the non-rotary swashplate. The electric current is then prevented from flowing over large fractions of conduction means towards the corresponding swashplate.

In addition, the protection means optionally include detection and quantification means for detecting and quantifying the electric current generated by a lightning strike in order to evaluate any damage, and make it possible to program maintenance action, for example.

In a first variant, the detection and quantification means comprise at least one trigger pivot of the electrical connection trigger means.

The trigger pivot then acts as a trigger pin as well as acting as a fuse. When the trigger pivot passes an electric current generated by a lightning strike, it is damaged.

By observing the damage due to erosion of at least one trigger pivot, it is possible to evaluate the magnitude of the electric current that has passed through the protection means. For example, a pointed trigger pivot made of a metal material may be eroded by 5 millimeters (mm) after passing a lightning current of 20 kiloamps (kA), with the values for the amount of erosion and the magnitude of the lightning being given by way of indication solely to illustrate the above-specified characteristics.

In a second variant that may be combined with the first variant, the detection and quantification means comprise at least one sensor for measuring the remanent magnetic field, which means are arranged on the predetermined path, and for example on one of the conduction means, i.e. the rotary conduction means or the non-rotary conduction means.

In addition to a rotor, the invention also provides an aircraft provided with the rotor.

Under such circumstances, the invention provides an aircraft provided with a power plant driving a power gearbox fastened to an airframe of the aircraft by fastener means, the aircraft having a rotor provided with a hub and a plurality of blades supported by the hub, the rotor including a mast secured to the hub to drive the hub and the blades in rotation about an axis of rotation, the mast being driven in rotation by the power gearbox, the rotor including protection means for providing protection against lightning.

The protection means then comprise rotary electric current conduction means constrained to rotate with the mast and connected to each blade by a respective first electrical connection member, the protection means having non-rotary electric current conduction means facing the rotary conduction means while not being constrained to rotate with the mast, the protection means including electrical connection trigger means arranged on at least one of the conduction means in a space separating the non-rotary conduction means from the rotary conduction means, the non-rotary conduction means being provided with a second electrical connection member suitable for being electrically connected to a target member external to the rotor.

It should be observed that the target member may be any member that does not form part of the rotor. Preferably, the target member may comprise the fastener means for fastening the power gearbox, such as oblique fastener bars, for example. It is then possible to insulate the fastener means electrically from the power gearbox, while conversely maintaining an electrical connection between the fastener means and the remainder of the airframe.

The present invention also provides a method of fabricating the above-specified device.

BRIEF DESCRIPTION OF THE DRAWINGS

The invention and its advantages appear in greater detail from the following description of embodiments given by way of illustration with reference to the accompanying figures, in which:

FIG. 1 is a view of an aircraft fitted with a rotor constituting a preferred embodiment; and FIG. 2 is a view of a rotor constituting an alternative embodiment.

DETAILED DESCRIPTION OF THE PREFERRED EMBODIMENTS

Elements present in more than one of the figures are given the same references in each of them.

FIG. 1 shows an aircraft 1 having an airframe and a rotary wing 2 having a rotor 10 that rotates about an axis of rotation AX relative to the airframe 5. The aircraft 1 then includes a power plant 3 for setting the rotor 10 into rotation via a power gearbox 4. The power plant 3 and the power gearbox 4 are secured to the airframe 5, e.g. being fastened to a floor 100 sometimes referred to as the "engine floor".

More particularly, the power gearbox 4 is fastened by fastener means 6 to the airframe 5, e.g. by sloping fastener bars 7.

The elements that rotate about the axis of rotation AX are said to be "rotary" while the elements that do not rotate about the axis of rotation AX, being secured to the airframe 5, are said to be "non-rotary".

The rotor 10 is provided with a mast 15 driven in rotation about the axis of rotation AX by the power gearbox 4, this mast 15 sometimes being referred to as the "rotor mast". The mast 15 may be fastened to an outlet shaft of the power gearbox 4 or it may be constituted by said outlet shaft, for example.

Under such circumstances, the mast 15 is fastened to a rotor hub 11 that carries a plurality of blades 12, each blade having a lift surface 13 and fastener means 14 for fastening it to the hub 11. By way of example, the fastener means 14 may comprise a cuff that is distinct from the lift surface, or indeed a cuff that is incorporated in said lift surface.

Under drive from the power gearbox 4, the mast 15 then drives the hub 11 and the blades 12 of the rotor 10 in rotation about the axis of rotation AX.

Furthermore, the rotor 10 include means 20 for modifying the pitch of the blades 12 of the rotor. These modifier means 20 comprise a set of two swashplates provided firstly with a non-rotary swashplate 23 that is not constrained to rotate about the axis of rotation AX of the mast 15 and the hub 11 and the blades 12, in particular, and secondly a rotary swashplate 22 that is constrained to rotate about the axis of rotation AX with the mast 15 and the hub 11 and the blades 12, in particular.

The rotary swashplate 22 is then arranged on the non-rotary swashplate so as to be free to rotate about the axis of rotation AX. In addition, the non-rotary swashplate is arranged about the mast 5 by means of a ball joint 21 suitable for moving in translation along the axis of rotation AX. It should also be observed that the rotary swashplate 22 is connected to the mast 15 by a first scissors linkage 24, the non-rotary swashplate 23 being connected to the airframe 5 by a second scissors linkage 26.

The non-rotary swashplate 23 is then controlled by a plurality of control rods 28 shown diagrammatically in FIG. 1, the rotary swashplate 22 being connected to each of the blades via a respective pitch rod 27, one such pitch rod 27 being shown diagrammatically in FIG. 1.

In accordance with the invention, the rotor 10 includes protection means 30 for providing protection against lightning strikes by acting as quickly as possible to discharge along a predefined path the electric current that is generated by such a lightning strike.

These protection means 30 comprise a first electrical connection member 31 per blade, e.g. a cable 31' made of an electrically conductive material. Each first electrical connection member 31 is fastened to a metal-plated point 16 of the corresponding blade, preferably at the leading edge 13' of the blade.

The protection means 30 further include rotary conduction means 32 constrained to rotate about the axis of rotation AX together with the mast 15, the hub 11, and the blade 12 of the rotor 10, in particular. The rotary conduction means 32 comprise a plate, each first fastener member 31 being fastened to said rotary conduction means 32.

The rotary conduction means 32 co-operate with non-rotary conduction means 33 of the protection means, the non-rotary conduction means 33 not being constrained to rotate about the axis of rotation AX together with the mast 15, the hub 11, and the blades 12 of the rotor 10 in particular.

The rotary conduction means 32 and the non-rotary conduction means 33 face each other, a space 37 separating the rotary conduction means 32 from the non-rotary conduction means 33. In addition, the rotary and non-rotary conduction means 32 and 33 may be parallel to each other about a common axis.

The rotary conduction means 32 are constituted by a plate, for example.

Furthermore, in order to encourage the creation of an electric arc between the rotary conduction means 32 and the non-rotary conduction means 33 so as to pass an electric current generated by lightning, the protection means 30 include electrical connection trigger means 35 arranged on at least one of the conduction means. For example, the electrical connection trigger means 35 could be arranged equally well either solely on the rotary conduction means 32, which is preferable, or else solely on the non-rotary conduction means 33.

Furthermore, each trigger element of the trigger means is located in the space 37, while being in contact with a single conduction means. For example, each trigger pivot is fastened to only one of the conduction means while pointing towards the other conduction means.

Thus, none of the elements of the trigger means physically connects the rotary conduction means 32 with the non-rotary conduction means 33, a gap of predetermined length separating each trigger element from the conduction means.

The electrical connection trigger means 35 may be provided with at least one trigger pivot 36, which is preferably pointed so as to concentrate electrons suitable for generating an electric arc. For example, at least one trigger pivot 36 is mounted vertically in register with each blade 12.

Finally, the protection means 30 are provided with a second electrical connection member 34 for connecting the non-rotary conduction means to a target member 38 outside the rotor 10, i.e. a member of the airframe 5 that is connected to the rotor 10, for example.

This electrical connection member 34 may comprise a plurality of electrical conductors, e.g. electric cables 34', each connected to a target member.

These target members may be the fastener means for fastening the power gearbox 4. Under such circumstances, the fastener means 6 may be electrically insulated from the power gearbox 4, e.g. by insulation made of plastics material, and electrically connected to the floor 100.

It should be observed that each second electrical connection member 34 may be connected to other elements of the airframe, e.g. the floor 100.

Consequently, when a blade is struck by lightning, the electric current runs along the leading edge 13' of the blade 12, and passes through the first connection member 31 to reach the rotary conduction means 32. The electric current then propagates to the non-rotary conduction means 33 and is then discharged via the second electrical connection member to the target members, e.g. the fastener rods 7.

Under such circumstances, the electric current does not reach the sensitive members of the rotor 10, e.g. the scissors linkages, the swashplates, and the hinges of the blades. Similarly, the current does not pass through the power gearbox 4, since the fastener bars 7 are electrically insulated from the power gearbox 4.

In order to encourage the electric current generated by a lightning strike of a blade to pass along the above-explained predefined path, the rotor 10 includes electrical insulation means 60 located between the metal-plated point 16 of each blade and the hub 11.

For example, these insulation means comprise a portion of the cuff 14 of a blade 12 that is made of a plastics material presenting very high electrical resistance.

The electric current is then encouraged to pass via the first electrical connection member.

Similarly, since the rotary conduction means 32 and the non-rotary conduction means 33 surround the mast 15, the rotor 10 includes electrical insulation 50 between the rotary conduction means 32 and the mast 15, and also between the non-rotary conduction means 33 and the mast 15.

For example, and with reference to FIG. 1, the rotary conduction means 32 are fastened to the outer periphery of the rotary swashplate 22 so as to be arranged around the mast 15, and the non-rotary conduction means 33 are fastened to the outer periphery of the non-rotary swashplate 23 so as to be arranged around the mast 15.

In this embodiment, it is then possible to provide a first electrically insulating spacer 52 between the rotary conduction means 32 and the rotary swashplate 22, and a second electrically insulating spacer 53 between the non-rotary conduction means 33 and the non-rotary swashplate 23.

Furthermore, the protection means 30 may include means 70 for detecting and quantifying the electric current generated by a lightning strike, e.g. means 70 for detecting and quantifying the magnitude of the electric current generated by a lightning strike.

In the embodiment of FIG. 2, the detection and quantification means 70 include at least one trigger pivot 36 of the electrical connection trigger means 35.

During a lightning strike, the trigger pivot 36 is damaged. Mere visual inspection may suffice to observe such damage. The trigger pivot 36 may be examined by examining the erosion of the trigger pivot 36. During the passage of the electric current, the trigger pivot 36 becomes heated, and this heating gives rise to quantifiable erosion of the trigger pivot.

With reference to FIG. 2, in an alternative embodiment, the detection and quantification means 70 comprise means 71 for measuring the remanent magnetic field located on the predetermined path. This measurement sensor 71 may be connected to a memory that stores measurements for subsequent use, for example.

The measurement sensor 71 for measuring the remanent field may be arranged, for example, on one of the electrical conduction means 32, 33 specifically on the rotary conduction means 32 in FIG. 2.

Furthermore, it can be seen in FIG. 2 that at least one of the conduction means may present a shape that is aerodynamic, by way of example, the rotary conduction means may present a shape that is frustoconical.

In addition, one of the conduction means 32, 33 may include closure means 200 for closing the space 37 at least in part in particular to protect the electrical connection trigger means 35, e.g. from saline mist. In a variant, the closure means comprise a plate secured to one of the conduction means 32 and lying flush with the other conduction means 33.

Finally, it should be observed that the trigger pivot 36 of the electrical connection trigger means 35 are arranged on the rotary conduction means 32 in the variant of FIG. 1, and on the non-rotary conduction means 33 in the variant of FIG. 2.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

It can be understood that the rotor may be a rotor of a wind turbine, for example, with the second electrical connection means being connected, for example, to metal-plating means of the structure of the wind turbine that carries the rotor, generally referred to as the nacelle.

What is claimed is:

1. A rotor comprising a hub and a plurality of blades supported by the hub, the rotor including a mast secured to the hub to drive the hub and the blades in rotation about an axis of rotation (AX), the rotor having protection means for providing protection against lightning, wherein the protection means comprise rotary electric current conduction means constrained to rotate with the mast and connected to each blade via a first electrical connection member, the protection means having non-rotary electric current conduction means facing the rotary conduction means, and the non-rotary conduction means not being constrained to rotate with the mast, the protection means including electrical connection trigger means arranged on at least one of the conduction means in a space separating the non-rotary conduction means from the rotary conduction means, the non-rotary conduction means being provided with a second electrical connection member suitable for being electrically connected to a target member external to the rotor; and wherein the rotor includes means for modifying the pitch of the blades, the means comprising an assembly of a non-rotary swashplate that is not constrained to rotate with the mast and a rotary swashplate that is constrained to rotate with the mast, the rotary swashplate being connected to each blade via a respective pitch rod, the rotary conduction means being fastened to the rotary swashplate and the non-rotary conduction means being fastened to the non-rotary swashplate, wherein a first electrically insulating spacer is provided between the rotary conduction means and the rotary swashplate, and with a second electrically insulating spacer between the non-rotary conduction means and the non-rotary swashplate.

2. A rotor according to claim 1, wherein the rotary conduction means and the non-rotary conduction means are carried by the mast, the rotor having electrical insulation between the rotary conduction means and the mast and also between the non-rotary conduction means and the mast.

3. A rotor according to claim 1, wherein at least a first electrical connection member is fastened firstly to a metal-plated point of the leading edge of a blade and secondly to the rotary conduction means.

4. A rotor according to claim 3, wherein the rotor includes electrical insulation means located between the metal-plated point and the hub.

5. A rotor according to claim 1, wherein the electrical connection trigger means comprise at least one pointed trigger pivot.

6. A rotor according to claim 1, wherein the electrical connection trigger means comprise at least one pointed trigger pivot arranged vertically in register with each blade.

7. A rotor according to claim 1, wherein the protection means include detection and quantification means for detecting and quantifying the electric current generated by a lightning strike.

8. A rotor according to claim 7, wherein the detection and quantification means comprise at least one trigger pivot of the electrical connection trigger means.

9. A rotor according to claim 7, wherein the detection and quantification means comprise at least one sensor for measuring the remanent magnetic field.

10. A rotor according to claim 9, wherein the sensor for measuring the remanent field is arranged on one of the conduction means.

11. An aircraft comprising a power plant driving a power gearbox fastened to an airframe of the aircraft by fastener means, the aircraft having a rotor provided with a hub and a plurality of blades supported by the hub, the rotor including a mast secured to the hub to drive the hub and the blades in rotation about an axis of rotation (AX), the mast being driven in rotation by the power gearbox, the rotor including protection means for providing protection against lightning, wherein the protection means comprise rotary electric current conduction means constrained to rotate with the mast and connected to each blade by a respective first electrical connection member, the protection means having non-rotary electric current conduction means facing the rotary conduction means while not being constrained to rotate with the mast, the protection means including electrical connection trigger means arranged on at least one of the conduction means in a space separating the non-rotary conduction means from the rotary conduction means, the non-rotary conduction means being provided with a second electrical connection member suitable for being electrically connected to a target member external to the rotor, wherein the protection means include detection and quantification means for detecting and quantifying the electric current generated by a lightning strike, and the detection and quantification means comprise at least one trigger pivot of the electrical connection trigger means.

12. An aircraft according to claim 11, wherein the target member comprises fastener means.

13. A rotor comprising a hub and a plurality of blades supported by the hub, the rotor including a mast secured to the hub to drive the hub and the blades in rotation about an axis of rotation (AX), the rotor having protection means for providing protection against lightning, wherein the protection means comprise rotary electric current conduction means constrained to rotate with the mast and connected to each blade via a first electrical connection member, the protection means having non-rotary electric current conduction means facing the rotary conduction means, and the non-rotary conduction means not being constrained to rotate with the mast, the protection means including electrical connection trigger means arranged on at least one of the conduction means in a space separating the non-rotary conduction means from the rotary conduction means, the non-rotary conduction means being provided with a second electrical connection member suitable for being electrically connected to a target member external to the rotor;

the rotor including means for modifying the pitch of the blades, the means comprising an assembly of a non-rotary swashplate that is not constrained to rotate with the mast and a rotary swashplate that is constrained to rotate with the mast, the rotary swashplate being connected to each blade via a respective pitch rod, the rotary conduction means being fastened to the rotary swashplate and the non-rotary conduction means being fastened to the non-rotary swashplate; and the protection means including detection and quantification means for detecting and quantifying the electric current generated by a lightning strike, the detection and quantification means comprising at least one sensor for measuring the remanent magnetic field, with the sensor for measuring the remanent field being arranged on one of the conduction means.

14. A rotor according to claim 13, wherein the rotary conduction means and the non-rotary conduction means are carried by the mast, the rotor having electrical insulation between the rotary conduction means and the mast and also between the non-rotary conduction means and the mast.

15. A rotor according to claim 13, wherein at least a first electrical connection member is fastened firstly to a metal-plated point of the leading edge of a blade and secondly to the rotary conduction means.

16. A rotor according to claim 15, wherein the rotor includes electrical insulation means located between the metal-plated point and the hub.

17. A rotor according to claim 13, wherein the electrical connection trigger means comprise at least one pointed trigger pivot.

18. A rotor according to claim 13, wherein the electrical connection trigger means comprise at least one pointed trigger pivot arranged vertically in register with each blade.

19. A rotor according to claim 13, that is provided with a first electrically insulating spaced is provided between the rotary conduction means and the rotary swashplate, and with a second electrically insulating spacer between the non-rotary conduction means and the non-rotary swashplate.

20. A rotor according to claim 13, wherein the detection and quantification means comprise at least one trigger pivot of the electrical connection trigger means.

* * * * *